United States Patent [19]

Stoddart et al.

[11] Patent Number: 5,766,681
[45] Date of Patent: Jun. 16, 1998

[54] INSULATION BARRIER AND A METHOD OF MAKING AN INSULATION BARRIER

[75] Inventors: John Stoddart, Eden Prairie, Minn.; George Cataldo, Des Moines, Iowa

[73] Assignee: Styro-Stop, Inc., Brooklyn Park, Minn.

[21] Appl. No.: 743,249

[22] Filed: Nov. 5, 1996

Related U.S. Application Data

[62] Division of Ser. No. 493,771, Jun. 22, 1995, Pat. No. 5,590,501.

[51] Int. Cl.[6] ............................ B05D 3/00; B05D 7/02; B05D 7/24
[52] U.S. Cl. ................... 427/244; 427/393.3; 427/393.5
[58] Field of Search ........................... 427/244, 393.3, 427/393.5, 397.8

[56] References Cited

U.S. PATENT DOCUMENTS

| | | | |
|---|---|---|---|
| 4,122,203 | 10/1978 | Stahl | 427/222 |
| 4,287,241 | 9/1981 | Kaufmann | 427/403 |
| 4,288,559 | 9/1981 | Illger | 427/421 |
| 4,349,494 | 9/1982 | Fulmer | 264/46.6 |
| 4,806,185 | 2/1989 | Porter et al. | 427/244 |
| 4,957,798 | 9/1990 | Bogdany | 428/95 |
| 5,112,678 | 5/1992 | Gay et al. | 427/372.2 |
| 5,413,828 | 5/1995 | DeKeyser | 428/36.5 |
| 5,414,970 | 5/1995 | Bontrager et al. | 52/408 |
| 5,506,048 | 4/1996 | Bussey, III et al. | 428/319.3 |
| 5,516,552 | 5/1996 | Bontrager et al. | 427/244 |

*Primary Examiner*—Diana Dudash
*Attorney, Agent, or Firm*—Deveau, Colton & Marquis

[57] ABSTRACT

The insulation barrier is formed of a body of foamed polystyrene, either expanded or extruded, which is provided with a protective coating formed of a metallic-based inorganic material and is applied over at least one surface of the body. Optionally, a fire resistant composition of any inorganic silicate, boric acid, any salts of boric acid, hydrated sodium borate (borax) or mixtures thereof, and preferably sodium silicate, is applied in solution form and maintained within the body by a wetting agent in the solution. The protective coating is being applied by a coating roller followed drying of the polystyrene body.

12 Claims, 3 Drawing Sheets

FIG. 5
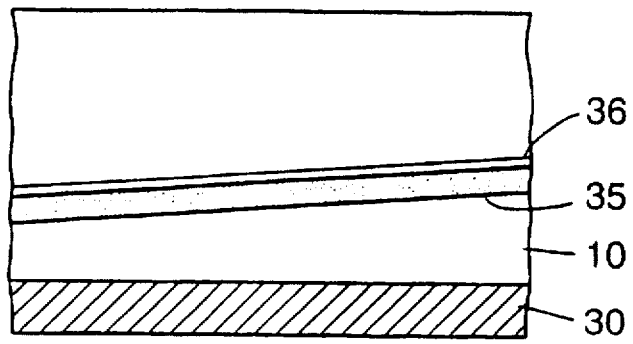
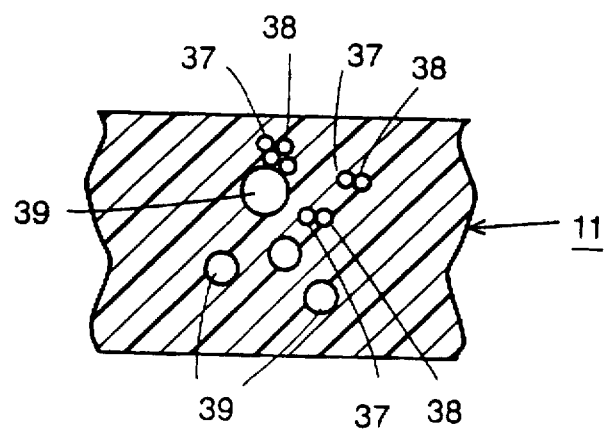
FIG. 6

INSULATION BARRIER AND A METHOD OF MAKING AN INSULATION BARRIER

This is a divisional of application Ser. No. 08/493,771, filed on Jun. 22, 1995, now U.S. Pat. No. 5,590,501.

BACKGROUND OF THE INVENTION

1. Field of the Invention

This invention relates to an insulation barrier. More particularly, this invention relates to a method of making an insulation barrier for a roof insulation system as well as a ceiling system.

2. Description of the Prior Art

As is known, various types of insulation systems have been employed in building construction. For example, insulation systems have been known to use insulation materials in rigid and blanket form, for example made of wood, glass, urethane, polystyrene and the like.

In the case of roof insulations, it has been known that built-up roofs of asphalt have not been able to produce all the characteristics of an optimum roof. That is to say, built-up roof of asphalt is flammable, relatively heavy and of low insulation value. In order to improve the insulation qualities of a roof construction, use has been made of urethanes since such types of products provide a better insulation and are of relatively light weight. In addition, urethanes permit thermal drift and require ozone depleting blowing agents. Hence, urethanes tend to be of higher costs and are not as environmentally friendly as one would desire. In addition, urethanes being of open cell construction tend to absorb water.

It has also been known that expanded polystyrene can be used as an insulation material particularly since expanded styrene can be manufactured at relatively low cost, is stable, is easy to install and absorbs less water than urethane. However, expanded polystyrene does not have a flame-spread capability to permit use on roof deck assemblies that have metal decks. Instead, expanded polystyrene insulation must be separated from the metal deck by means of an approved thermal barrier, such as sheet rock, perlite, polyisocyanuate (PIR) or polyurethane (PUR). For example, guidelines that usually determine products that can be approved for roofing applications are set by local building codes. Some building codes follow the Uniform Building code which requires that a roof deck assembly with a metal deck substrate using expanded polystyrene (EPS) as an insulation board, must have a thermal barrier of ¾ Perlite or ⅝ inch gypsum wall board installed between the metal deck and the EPS. Instead of using such wall board, any proposed roof assembly must successfully perform an insulated steel deck test. In this regard, there are two recognized agencies that perform an insulated steel deck test, one is Factory Mutual under F.M. test number 4450 and the other, Underwriters Laboratory under U.L. test number 1256.

Still further, it has been known to provide various types of substrates with coatings or the like in order to increase the flame and heat resistant characteristics of the substrate. For example, U.S. Pat. No. 4,647,500 describes a foamed plastic composition in which a coating of an inorganic binder composition is placed on the surface of the foamed plastic with or without the interposition of an elastomer coating. As described, the inorganic binder composition is liquid and comprises colloidal silica, monoaluminum phosphate and aluminum chlorohydrate. As an option, an alkyl tin halide catalyst may be employed to improve the bonding between the binder composition and the surface to which the composition is applied.

U.S. Pat. No. 4,702,861 describes a flame retardant coating which can be applied to various types of surfaces including synthetic resin foams in order to create a substantially continuous protective film so as to encapsulate and surface-envelope the structure onto which the composition is applied. As described, the coating is made from a working aqueous latex dispersion. In addition, the composition may be mixed with sodium silicate.

U.S. Pat. No. 5,035,951 describes a composition for retarding flame which employs a water soluble alkali metal silicate such as sodium silicate.

Similar coatings for flame retardation which employ sodium silicate, at least in part, are also described in U.S. Pat. Nos. 2,407,615; 4,179,535; 4,710,309; and 4,888,057.

Other materials have also been known for use in fire retarding composition such as hydrated aluminum silicate, as described in U.S. Pat. No. 3,490,065; aluminum hydroxide, as described in U.S. Pat. No. 5,034,056 and hydrated alumina or magnesium hydroxide as described in U.S. Pat. No. 5,215,581.

Still further, it has been known to provide a polyurethane foam with a coating of an intumescent material, for example, vermiculite coated with ammonium phosphate, such as described in U.S. Pat. No. 3,455,850.

Despite the knowledge of using coatings of various types on substrates as well as compositions in a substrate to enhance fire retardant characteristics, there has been no product on the market which employs a foamed polystyrene as a flame retardant insulation barrier particularly for metal roof decks.

SUMMARY OF THE INVENTION

Accordingly, it is an object of the invention to provide an insulation barrier made of a foamed polystyrene which can be used on a metal roof deck without the need for a thermal barrier.

It is another object of the invention to provide a foamed polystyrene insulation barrier which has an enhanced flame and fire-resistant characteristic.

It is another object of the invention to improve the fire-resistant characteristics of foamed polystyrene insulation.

It is another object of the invention to reduce the cost of constructing insulated metal roofs.

Briefly, the invention provides an emulsion barrier which is comprised of a body of foamed polystyrene, either expanded or extruded, having a protective coating including a metallic-based inorganic material, for example, aluminum oxide trihydrate, hydrated boron oxide, antimony oxide, titanium dioxide, and/or magnesium hydroxide, on at least one surface. The protective coating may also include an organic emulsion, for example, latex. Optionally, the body may be impregnated with a fire resistant composition, such as any inorganic silicate, boric acid, salts of boric acid, hydrated sodium borate (borax) or mixtures thereof.

The invention further provides a method of making an insulation barrier including the steps of obtaining a body of foamed polystyrene, for example in continuous form or in panel form. An emulsion of a metallic based inorganic material, such as hydrated alumina, and a latex, is then applied to at least one surface of the body followed by drying of the emulsion in order to form a protective coating on the body.

Optionally, the method may also include the step of forming a plurality of recesses in at least one surface of the body and impregnating a fire resistant composition, preferably of sodium silicate and a wetting agent into the recesses. Impregnation may occur by spraying, flood coating, roll coating or manually applying the solution onto the top surface of the body of foamed polystyrene so that the solution passes into the recesses and permeates into the interior of the polystyrene. Alternatively, the protective coating may be applied prior to drying of the impregnated polystyrene body, for example, to provide a one-step application of the impregnant and the protective coating.

The impregnation of the foamed polystyrene body with the fire resistant composition of, for example, sodium silicate serves to enhance the fire-resistant and strength characteristics of the foamed polystyrene without compromising the insulation qualities of the polystyrene.

Once the fire resistant composition penetrates the foamed polystyrene body a layering effect is believed to begin to take place in the fire resistant composition, particularly, sodium silicate, within the polystyrene. The application of the emulsion of the hydrated alumina is believed to accelerate the multiplication of the silica layers which occurs within the polystyrene body while coating one side of the body. During the subsequent drying process, aging takes place during which a large increase in strength characteristics takes place within the closed cell polystyrene body. This is believed to take place chemically by a polymerization process between, for example, the sodium silicate and hydrated alumina.

The resultant insulation barrier has been found to possess outstanding fire performance characteristics that will pass the Underwriters Laboratory test number 1256 for interior fire exposure without he use of a thermal barrier.

In comparison with other known products, the resulting insulation barrier of foamed polystyrene is most stable in the area of aged thermal values and product stability. Further, the insulation barrier can be placed directly on top of a steel roof deck because the insulation barrier contains within itself the ability to withstand server fire.

The insulation barrier possess several advantages. First, because the barrier does not use chloroflourocarbons (CFC's) or hydrochloroflourcarbons (HCFC's) the barrier is less harmful to the environment than materials using such compounds. Further, the insulation barrier has excellent fire-resistant characteristics and under actual fire situations has been found to release a reduced amount of toxic gases.

The cost of producing the foamed polystyrene insulation barrier is relatively low. further, the labor required for incorporating the barrier into a roof insulation system is relatively low. In this respect, the barrier is light weight, easy to handle and easy to install.

The insulation barrier has a stable thermal performance capable of maintaining a high R value of the anticipated life of the insulation system in which the barrier is employed. Also, waste of important energy products passing through a roof because of unrealistic thermal performance ratings is reduced.

These and other objects and advantages of the invention will become more apparent from the following detailed description taken in conjunction with the accompanying drawings wherein.

BRIEF DESCRIPTION OF THE DRAWINGS

FIG. 5 illustrates a cross sectional view of a further roof insulation system employing an insulation barrier in accordance with the invention in a tapered arrangement; and FIG. 6 schematically illustrates a nanostructure which is believed to occur within the foamed polystyrene body in accordance with the invention.

DESCRIPTION OF THE PREFERRED EMBODIMENT

Figure 1:
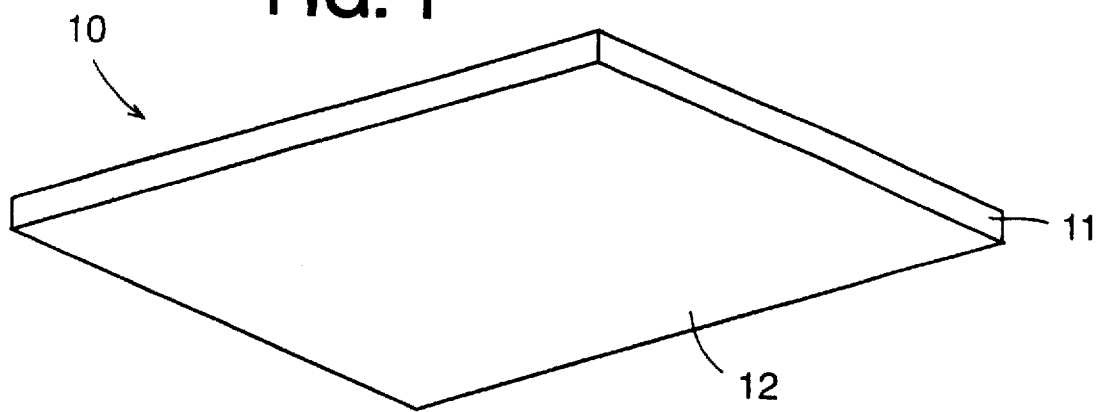
FIG. 1 illustrates a perspective view of a polystyrene insulation barrier of panel shape constructed in accordance with the invention.

Referring to FIG. 1, the insulation barrier 10 is constructed in panel form, for example in panels having a length of 96 inches, a width of 48 inches, and a thickness in the range of from ½ inch to 10 inches. Typically, the panels would have a 2 inch thickness.

The insulation barrier 10 is formed of a body 11 of polystyrene, either expanded (EPS) or extruded, having closed cells. In this respect, the polystyrene may be foamed in any known suitable manner.

Typically, the foamed polystyrene body 11 is obtained with a flat bottom surface and a flat top surface which may be parallel or tapered relative to the bottom surface.

The insulation barrier 10 also has a protective coating layer 12 on the surface which is to be disposed in facing relation to the space in which a flame may be generated. When the insulation barrier 10 is to be installed on metal deck, the protective coating would be placed on at least the bottom surface of the body 11 which bottom surface would be in facing relation to the metal deck. Alternatively, the protective coating 12 may face in the opposite direction, depending on the application. This protective coating 12 is formed of a metallic-based inorganic material, such as aluminum oxide trihydrate, hydrated boron oxide, antimony oxide, titanium dioxide, magnesium hydroxide, and mixtures of two or more of such compounds. Optionally, the barrier 10 may also have a fire resistant composition, preferably selected from any inorganic silicate, such as sodium or potassium silicate, boric acid, salts of boric acid, hydrated sodium borate (borax) and mixtures thereof.

Figure 2:
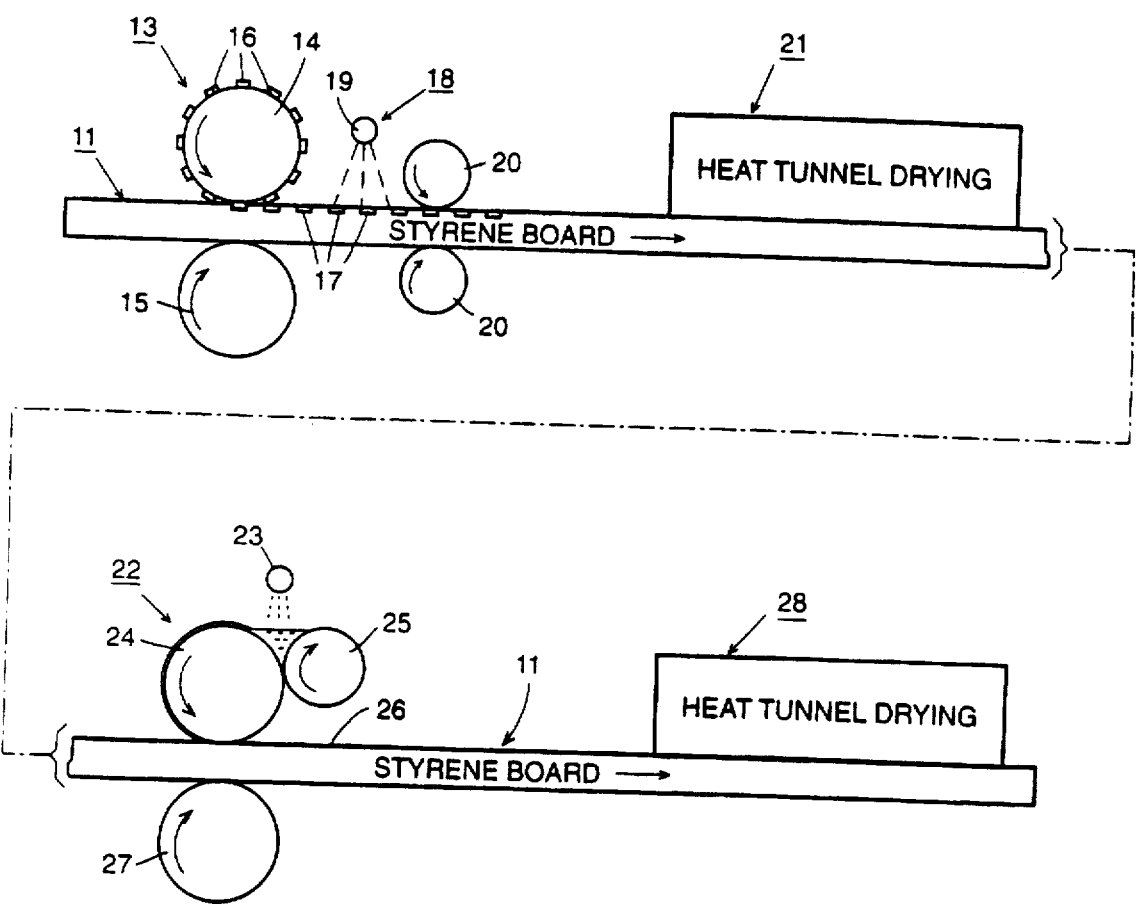
FIG. 2 schematically illustrates an apparatus for producing an insulation barrier in accordance with the invention.

Referring to FIG. 2, in order to make the insulation barrier 10, the body 11 of foamed polystyrene which is obtained in continuous sheet form, or in panel form, may be fed by a suitable conveying means along a predetermined path into an optional penetrating station 13 having a penetrating means in the form of a pair of rollers 14, 15 as indicated, the upper roller 14 is provided with a plurality of projections 16 which are randomly or uniformly spaced circumferentially and transversely on the roller 14 while the bottom roller 15 is smooth-surfaced. Alternatively, both rollers 14, 15 may have projections thereon. The two rollers 14, 15 serve to provide a nip therebetween which is equal to or slightly less than the thickness of the body 11 of expanded polystyrene. As the foamed polystyrene body 1 passes between the rollers 14, 15, the projections 16 on the upper roller 14 punch through the skin normally found on the body 11 to form recesses 17 in the upper surface of the polystyrene body 11. For example, where the polystyrene body 11 is of a thickness of 2 inches, the recesses 17 may penetrate ¼ inch into the top surface of the body 11, being spaced apart on one inch centers. Typically, the projections 16 on the roller 14 are of ⅛ inch to ⅝ inch diameter so that the recesses have a diameter of 1/16 inch to ⅝ inch and penetrate to a depth of form 1/16 to ⅞ inches.

The optional penetrating station 13 may employ any other suitable means whereby recesses, cuts, indentations or the like are formed in the skin at the top surface and/or the bottom surface in the traveling body 11 of foamed polystyrene in order to permit penetration of fire-proofing material. For example, knives or saw cuts may also be used for this purpose.

Thereafter, the traveling body 11 may be passed through an impregnating station 18, which also is optional, wherein a solution including a fire resistant composition, as previously described, is applied to the top surface of the body, for example by spraying from a suitable sprayer 19.

The preferred solution which is applied to the traveling body 11 at station 18 is made of sodium silicate, water and a wetting agent. The wetting agent may be Pentex No. 99 (a vinyl acetate/ethylene and vinyl chloride polymer made by Rhone Poulenc) or Tween 20 (a polysorbate 20 sold by ICI), for example, the solution may be made in weight % as follows:

Sodium Silicate—65 to 85%
Water—14.2 to 34.2%
Wetting Agent—0.01 top 0.1%

Preferably, the solution is made of 78% sodium silicate, 21.7% water and 0.03% wetting agent. The solution is applied at a rate of from 1 to 6 pounds (wet) and preferably, from 2.5 to 3.0 pounds (wet) per sheet wherein the sheet has a typical width of 48 inches, a length of 96 inches and a thickness of 2 inches.

Alternatively, the solution may be applied to the bottom of the traveling body 11 or to both the top and bottom of the body 11 via suitable means such as a machine employing coating rollers for coating the top and bottom surfaces of a traveling body.

Thereafter, if the body is passed through station 18, it is next directed through a pair of guide rollers 20 of the conveying means, and delivered into a drying station 21, for example in the form of a heat tunnel. The impregnated body 11 is then dried, for example at a temperature of from 140° F. to 200° F. for a time period of 6 to 12 minutes.

Thereafter, the body 11 is conveyed to a coating station 22 in which a protective coating is applied to the top surface of the body 11. If optional penetrating station 13 and impregnating station 18 are omitted, the body 11 of foamed polystyrene may be fed directly by the conveying to coating station 22. As indicated, the protective coating can be supplied from a spigot 23 into a space between two rotating rollers 24, 25 of different diameters. The smaller roller 24 serves as an applicator roller while the larger roller 25 serves as a coating roller. As indicated, the protective coating forms a coating 26 on the larger roller 25 which is then conveyed onto the body 11 of polystyrene traveling under the coating roller 25. In addition, a third roller 27 is disposed below the coating roller 25 so as to form a nip therewith through which the traveling body 11 passes. During passage, the protective coating is applied directly to the top surface of the traveling body 11.

The protective coating which is applied to the traveling body 11 is made up of a metallic-based inorganic material, such as hydrated alumina (aluminum oxide trihydrate) and may also include a wetting polymer compound, such as Airflex No. 728 (a vinyl acetate/ethylene/vinyl chloride polymer latex emulsion) sold by Air Products and Chemicals, Inc. Typically, the hydrated alumina comprises in weight % of from about 50% to about 80% of the emulsion while the latex comprises the remainder.

The emulsion is preferably formed on the basis of 66% by weight of hydrated alumina and 33% of Airflex No. 728 with both components being mixed thoroughly. This mixture is applied at the rate of from 1 to 6 pounds (wet) and preferably a minimum of 3.25 pounds per sheet of a width of 48 inches and a length of 96 inches.

Thereafter, the traveling body 11 is passed into a further drying station 28, for example in the form of a heat tunnel, and dried so that the applied emulsion forms the protective coating 12 on the body 11.

Alternatively, the first drying station 21 may be omitted so that the impregnating solution (if applied) and the protective coating are applied in a one-step operation prior to the foamed polystyrene body 11 reaching the second drying station 28.

The traveling body 11 may then be cut by suitable cutters (not shown) into panels of suitable length, for example lengths of 120 inches. Thereafter, a plurality of such panels can be bundled into larger units, for example bundles of 48 inches by 48 inches by 96 inches, bagged and banded for shipment.

Figure 3:
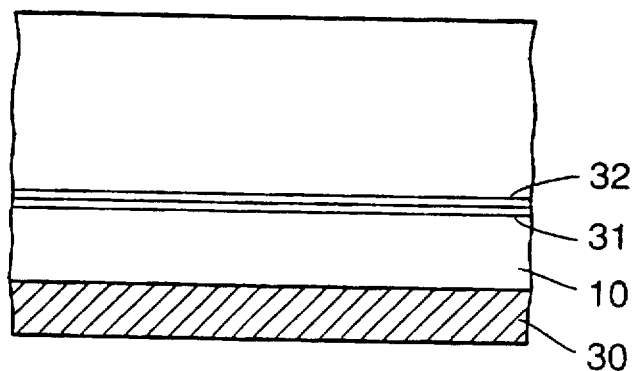
FIG. 3 illustrates a view of the insulation barrier employed in a roof insulation system.

Referring to FIG. 3, the insulation barrier 10 may be employed in a roofing system which employs a steel roof deck 30. As indicated, the steel roof deck 30 is disposed in a horizontal plane and the insulation barrier 10 is placed as a layer directly onto the steel roof deck 30 with the encapsulating layer 12 facing the metal roof deck 30. Subsequently, the barrier 10 is covered over by a barrier sheet 31 of known construction and an overlying membrane 32 of known construction. In this embodiment, the insulation barrier 10 may be adhered or mechanically attached to the steel roof deck 30 as a single ply system. Alternatively, multiple layers of the insulation barrier 10 may be used.

Figure 4:
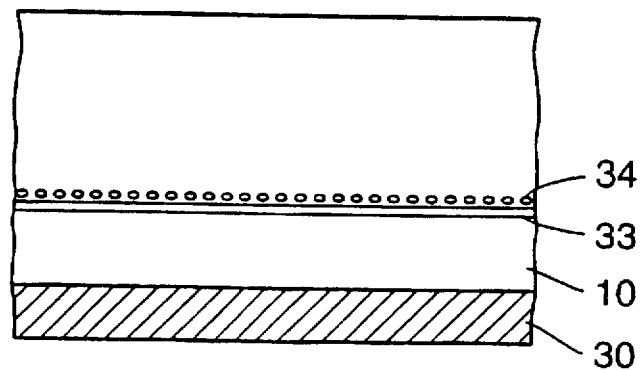
FIG. 4 illustrates a cross sectional view of modified roof insulation system employing an insulation barrier in accordance with the invention.

Referring to FIG. 4, wherein like reference characters indicate like parts as above, the insulation barrier 10 may be incorporated in a ballasted roof system. As indicated, the insulation barrier 10 is secured directly to the steel roof deck 30 and a membrane 33 is applied over the insulation barrier 10. In addition, a layer of ballast 34 is applied over the membrane 33.

Referring to FIG. 5, wherein like reference characters indicate like parts as above, the insulation barrier 10 may be employed in a built up roof (BUR) system. In the illustrated embodiment, the insulation barrier 10 is provide with a tapered top surface rather than a horizontal surface as in the other illustrated embodiments. In addition, a rigid overlayment 35 of known construction is applied over the insulation barrier 10 and a BUR layer 36 is applied over the rigid overlayment 35 as is known. Typically, the tapered embodiment would be tapered to accommodate a ⅛ inch per foot slope.

Typically, the insulation barrier 10 can be installed in panels of a thickness of from ½ inch to 10 inches or more.

The use of the fire resistant composition, such as sodium silicate, in a water solution serves to enhance the introduction of the composition into the interstices within the foamed polystyrene body 11. Further, the use of the wetting agent serves as a control to allow the composition to enter and migrate into the foamed polystyrene body 11.

Referring to FIG. 6, the reaction that takes place within the polystyrene body 11 between the fire resistant composition 37, when used, and the metallic-based inorganic material 38, such as aluminum oxide trihydrate, is believed to be based upon a nanostructured (nanophase) material.

That is, the combination, in particular, of sodium silicate and aluminum oxide tyrihydrate provides interfaces which influence the mechanical properties of the body 11. Multilayered sandwich-like materials are made inside the body 11 and about the cells 39 thereof which may be characterized as frequent, periodic interlayer boundaries. These layers of varying composition interface to initiate crystal structure which renders the overall product stronger.

The aluminum oxide trihydrate included within the top coating 26 is forced and continuously migrates into the penetrated area of the polystyrene body 11 including the interstices of the body to intermingle with the sodium silicate (silica) to create a high crystalline bond.

The nanocomposite chains which are formed by the delayed polymerization reaction taking place between the silicate and aluminum/latex emulsion produces a strong insulation barrier product.

The insulation barrier may be used not only in roof deck systems but also in the form of other products, such as ceiling tiles, patio enclosures and the like.

The invention thus provides a foamed polystyrene body having enhanced fire resistant characteristics and strength. Further, the invention provides a foamed polystyrene body which can be used as an insulation barrier, for example in a roof installation system without need for a thermal barrier.

Having now fully described the invention, it will be apparent to one of ordinary skill in the art that many changes and modifications can be made thereto without departing from the spirit or scope of the invention as set forth herein.

What is claimed is:

1. A method of making a silicate-free insulation barrier comprising the steps of:
   a. obtaining a body of silicate-free foamed polystyrene having at least an upper surface;
   b. applying an emulsion including a metallic-based inorganic material to said upper surface of said body; and
   c. drying the applied emulsion to form a protective coating on said body.

2. A method as set forth in claim 1 wherein said emulsion comprises aluminum oxide trihydrate and latex.

3. A method as set forth in claim 1, wherein said metallic-based inorganic material is selected from the group consisting of aluminum oxide trihydrate, hydrated boron oxide, antimony oxide, titanium dioxide, magnesium hydroxide and mixtures of at least two of said materials.

4. A method as set forth in claim 3, wherein said emulsion is an organic emulsion.

5. A method as set forth in claim 4, wherein said organic emulsion is comprised of vinyl acetate, ethylene and vinyl chloride polymer.

6. A method as set forth in claim 1, wherein said foamed polystyrene is selected from the group consisting of expanded and extruded polystyrene.

7. A method of making a silicate-free insulation barrier comprising the steps of:
   a. obtaining a body of foamed polystyrene having at least an upper surface wherein said body is not impregnated with a silicate;
   b. applying an emulsion including a metallic-based inorganic material to said upper surface of said body; and
   c. drying the applied emulsion to form a protective coating on said body.

8. A method as set forth in claim 7 wherein said emulsion comprises aluminum oxide trihydrate and latex.

9. A method as set forth in claim 7, wherein said metallic-based inorganic material is selected from the group consisting of aluminum oxide trihydrate, hydrated boron oxide, antimony oxide, titanium dioxide, magnesium hydroxide and mixtures of at least two of said materials.

10. A method as set forth in claim 9, wherein said emulsion is an organic emulsion.

11. A method as set forth in claim 10, wherein said organic emulsion is comprised of vinyl acetate, ethylene and vinyl chloride polymer.

12. A method as set forth in claim 7, wherein said foamed polystyrene is selected from the group consisting of expanded and extruded polystyrene.

* * * * *